(No Model.) 2 Sheets—Sheet 1.
C. A. BIRCHER.
COMBINED WIND AND WATER ENGINE.
No. 558,475. Patented Apr. 21, 1896.
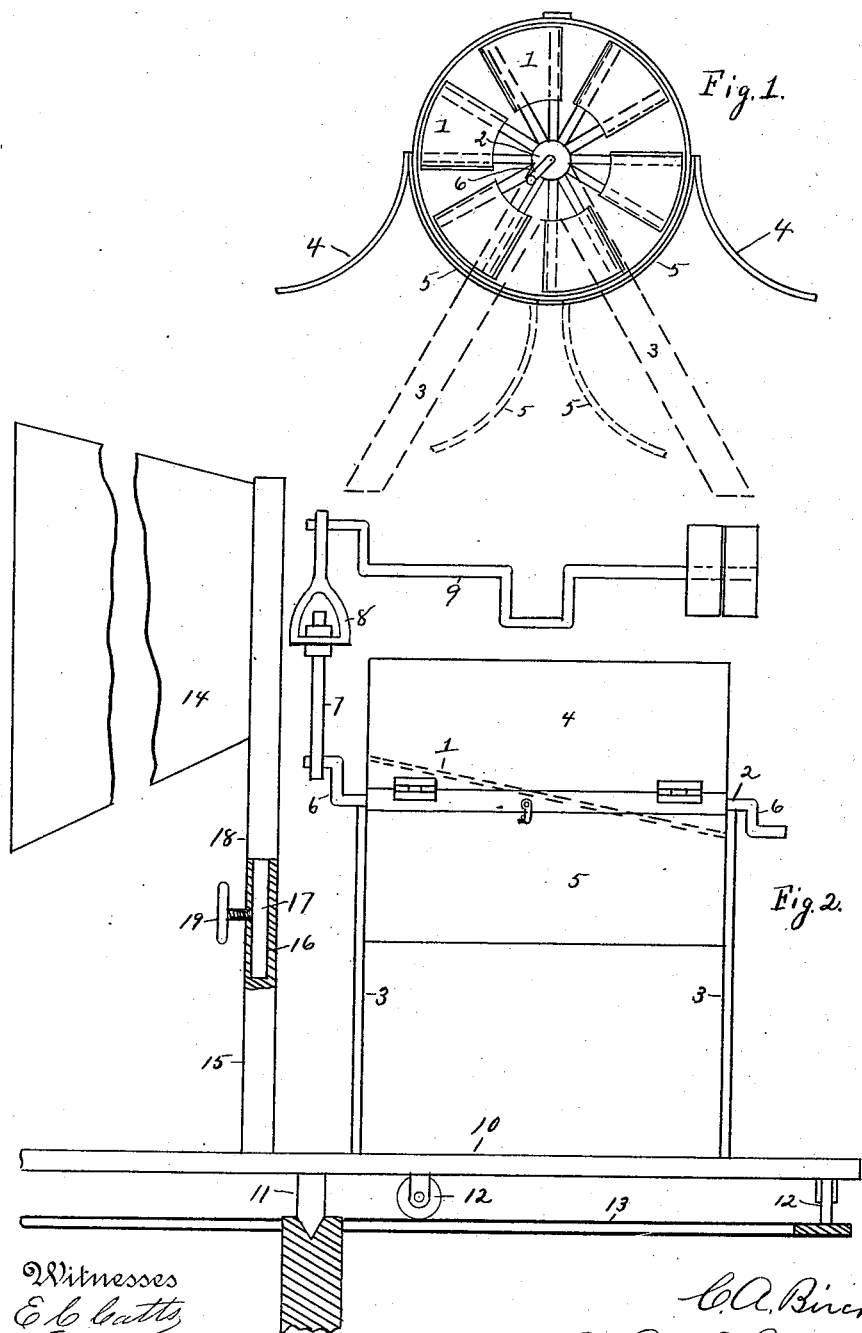

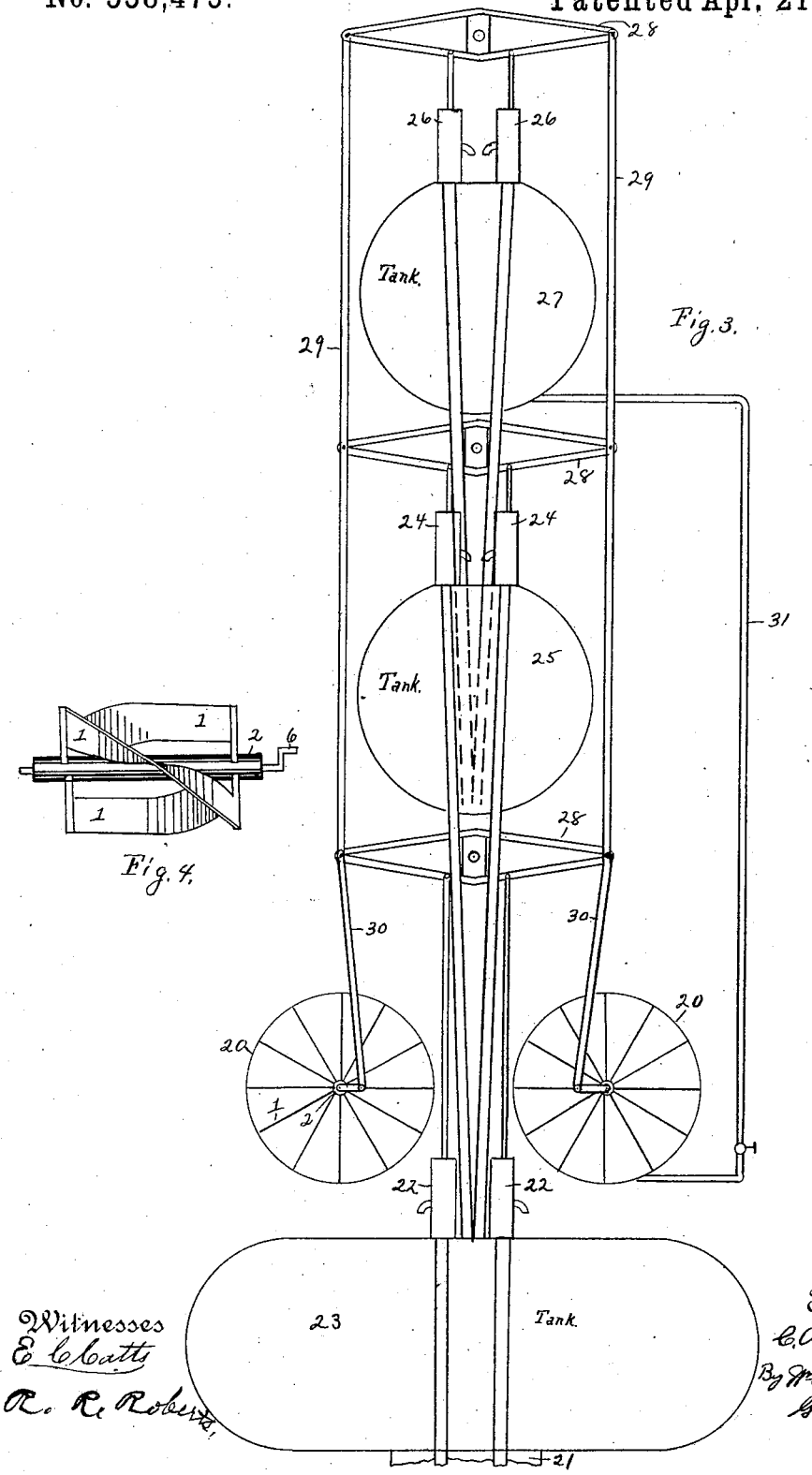

UNITED STATES PATENT OFFICE.

CORNELIUS A. BIRCHER, OF HEDRICK, IOWA.

COMBINED WIND AND WATER ENGINE.

SPECIFICATION forming part of Letters Patent No. 558,475, dated April 21, 1896.

Application filed December 30, 1895. Serial No. 573,764. (No model.)

*To all whom it may concern:*

Be it known that I, CORNELIUS A. BIRCHER, a citizen of the United States, residing at Hedrick, in the county of Keokuk and State of Iowa, have invented a certain new, useful, and valuable Improvement in a Combined Wind and Water Engine, of which the following is a full, clear, and exact description.

My invention has relation to combined wind and water engines; and it consists in the novel construction and arrangement of its parts, as hereinafter described.

In the accompanying drawings, Figure 1 is an end view of the revolving blades and their cylindrical casing. Fig. 2 is a side view of the blade-cylinder, also showing the engine mounted on a turn-table, a weather-vane, and the means for transmitting power from the engine to a permanently-located shaft. Fig. 3 is a side view of a device for elevating water which may be used to operate the engine. Fig. 4 is a perspective showing how the blades are secured to the revolving shaft.

The engine consists of a number of revolving blades 1 1. These blades are pitched at an angle, as indicated by the dotted lines in Fig. 2. The blades are mounted on a horizontal shaft 2, said shaft in turn being journaled in suitable uprights 3 3. The blades are surrounded by a cylindrical casing. Said casing consists of the top hinged sections 4 4 and the lower hinged sections 5 5. The ends of the cylindrical casing are open, or either the upper or lower parts of the ends may be closed, if so desired. The ends of the shaft 2 may be fashioned into crank-arms 6 6, by means of which motion may be transmitted to other mechanisms. Fig. 2 shows one of the crank-arms 6 connected to the pitman 7, said pitman having the swivel-joint 8, the upper end of the said pitman connecting to the crank-arm of the shaft 9, said shaft 9 being permanently located in suitable stationary bearings, said shaft 9 also being provided with suitable elbows or pulley-wheels for the transmission of motion.

As shown in Fig. 2, the engine may be mounted on a turn-table 10, said table being pivoted at the point 11, said point 11 being directly under the swivel-joint 8 in the pitman 7. The outer edges of the table 10 are supported by the roller-wheels 12 12, which run on the track 13. The table is provided with a vane 14. Said vane consists of the upright 15, which is fixed at its lower end to the table 10. The upper end of the upright 15 is provided with a socket 16, in which is located the extension 17 of the vane-shaft 18. A turn-screw 19 passes through the side of the socket 16 and is adapted to bear at its inner end against the extension 17, and thus hold the vane in any desired position relative to the table 10 or the engine mounted thereon.

The engine may be operated by the wind passing horizontally through the closed cylinder, the wind operating against the inclined surfaces of the blades 1 1, or the engine may be placed laterally to the direction from which the wind is coming, and the upper sections 4 4 may be lowered, as shown in Fig. 1, and thus the wind will operate the engine as an overshot wheel. In addition to this a jet of water may be applied to the blades when they are at their lowest positions, and thus if the wind is not strong the wheel will be operated by the combined action of the wind and the water. Fig. 3 shows an arrangement for applying water to the engine.

By means of having the adjustable vane 14 located on the table 10 the vane can be so adjusted as to bring any desired side or end of the cylindrical casing for the blades 1 1 against the wind.

In Fig. 3 the engines 20 20 are adapted to operate a device for lifting water, and when said water is lifted it may be used to run the engines should the wind cease or to assist the wind should the latter cease blowing with sufficient force to operate the engines.

21 indicates a well or other water-supply. The pumps 22 22 are adapted to bring water from the well 21 and deposit the water in the tank 23. From the tank 23 the water is carried up by the pumps 24 24 and is deposited in the tank 25. From the tank 25 the pumps 26 26 carry the water up and deposit it in the tank 27. The pumps are arranged in pairs, as shown, and each pump is connected with one side of a walking-beam 28, said walking-beams being suitably supported in framework. (Not shown in the drawings.) The ends of the beams 28 28 are connected by the upright pitmen 29 29. One end of the lower walking-beam 28 is connected by a pitman 30 with one of the engines, and the other end of the said walking-beam is connected by a similar pitman to the other engine. The pipe 31 leads from the tank 27. Said pipe 31 is adapted to throw a jet of water against the blades of the engine, as shown, and thereby operate or help operate the same. The other engine may have a similar pipe, if necessary, or the pipe may apply the jet of water to either side of the blades, as desired. After the water has passed against the blades it may be lead into the tank 23, or it may be diverted into other channels for irrigation or watering purposes.

The pumps, as shown in Fig. 3, are connected to the beams 28 28, and as said beams are operated the pumps are operated and lift the water, as described. It will be observed that with this arrangement of the pumps there will be a continuous stream of water passing into the upper tank, for one pump in each pair is pouring forth water while the other is not, and vice versa.

The power derived from this engine may be transmitted to the shaft 9, and from thence it may be utilized for purposes too numerous to specify.

Having described my invention, what I claim as new, and desire to secure by Letters Patent, is—

The combination with an engine consisting of a number of blades mounted on a revolving shaft of, a cylindrical casing inclosing said blades, said casing having in its upper and lower parts hinged sections adapted to be swung to one side.

In testimony whereof I affix my signature in presence of two witnesses.

CORNELIUS A. BIRCHER.

Witnesses:
C. G. JOHNSTON,
E. A. JOHNSTON.